United States Patent [19]

Hendow et al.

[11] Patent Number: 4,825,260
[45] Date of Patent: Apr. 25, 1989

[54] APPARATUS AND METHOD USING AMPLIFICATION CELLS FOR RING LASER GYROSCOPE CAVITY LENGTH CONTROL

[75] Inventors: Sami T. Hendow; Graham J. Martin, both of Canoga Park; Sheridan W. Hammons, Thousand Oaks, all of Calif.

[73] Assignee: Litton Systems, Inc., Beverly Hills, Calif.

[21] Appl. No.: 17,429

[22] Filed: Feb. 20, 1987

[51] Int. Cl.$^4$ ............................................... G01C 19/64
[52] U.S. Cl. ...................................... 356/350; 372/94; 372/32
[58] Field of Search .................... 356/350; 330/4.3, 41; 372/32, 94

[56] References Cited

U.S. PATENT DOCUMENTS

| | | |
|---|---|---|
| 3,503,005 | 3/1970 | Mocker . |
| 3,921,099 | 11/1975 | Abrams et al. ................... 372/32 |
| 4,320,974 | 3/1982 | Ljung ................................. 356/350 |
| 4,473,297 | 9/1984 | Simpson et al. . |
| 4,597,667 | 7/1986 | Curby et al. . |
| 4,637,255 | 1/1987 | Martin . |

Primary Examiner—Vincent P. McGraw
Assistant Examiner—S. A. Turner
Attorney, Agent, or Firm—Lynn & Lynn

[57] ABSTRACT

An apparatus and method for path length control for a laser gyro using two external gain cells and the shifted gain spectra of two neon isotopes. The laser cavity is stabilized by detecting the difference in the amplification rate between the two gain cells that are traversed by two rays. Absorption cells may be used to replace the gain cells.

48 Claims, 6 Drawing Sheets

APPARATUS AND METHOD USING AMPLIFICATION CELLS FOR RING LASER GYROSCOPE CAVITY LENGTH CONTROL

BACKGROUND OF THE INVENTION

This invention relates generally to rotation sensors and particularly to ring laser gyroscope rotation sensors. Still more particularly, this invention relates to apparatus and methods for stabilizing the frequency of light produced in a ring laser.

A ring laser gyroscope employs the Sagnac effect to detect rotation. Two counterpropagating light beams in a closed loop will have transit times that differ in direct proportion to the rotation rate of the loop about an axis perpendicular to the plane of the loop. There are in general two basic techniques for utilizing the Sagnac effect to detect rotations. A first technique is the interferometric approach, which involves measuring the differential phase shift between two counterpropagating beams injected from an external source, typically a laser, into a Sagnac ring. The ring may be defined by mirrors that direct the light beams around the path or by a coil of optical fiber. Beams exiting the path interfere and create a pattern of light and dark lines that is usually called a fringe pattern. Absolute changes in the fringe pattern are indicative of rotation of the ring. The primary difficulty with such devices is that the changes are very small for rotation rates of interest in guidance applications.

The ring laser gyroscope uses the resonant properties of a closed cavity to convert the Sagnac phase difference between the counter propagating beams into a frequency difference. The high optical frequencies of about $10^{15}$ Hz for light used in ring laser gyroscopes cause the minute phase changes to become beat frequencies that are readily measured. The cavity length must be precisely controlled to provide stability in the lasing frequency. A stable frequency is required to provide the desired accuracy in measuring rotations.

A ring laser gyroscope has a sensor axis that passes through the closed paths traversed by the counterporpagating beams. When the ring laser gyroscope is not rotating about its sensor axis, the optical paths for the two counterpropagating beams have identical lengths so that the two beams have identical frequencies. Rotation of the ring laser gyroscope about its sensor axis causes the effective path length for light traveling in the direction of rotation to increase while the effective path length for the wave traveling in the direction opposite to the rotation decreases.

Ring laser gyroscopes may be classified as passive or active, depending upon whether the lasing, or gain medium is external or internal to the cavity. In the active ring laser gyroscope the cavity defined by the closed optical path becomes an oscillator, and output beams from the two directions beat together to give a beat frequency that is a measure of the rotation rate. The oscillator approach means that the frequency filtering properties of the cavity resonator are narrowed by many orders of magnitude below the passive cavity and give very precise rotation sensing potential. To date the major ring laser gyroscope rotation sensor effort has been put into the active ring laser. Presently all commercially available optical rotation sensors are active ring laser gyroscopes.

U.S. Pat. No. 4,449,824 issued May 22, 1984 to Matthews is directed toward producing output signals representing the frequency differences between counter-circulating wave pairs circulating as two beams within the gyroscope cavity. A partially transmitting dielectric mirror forms both one of the cavity reflectors and means for extracting a small portion of each beam to be processed by cavity length control apparatus.

U.S. Pat. No. 4,482,249 issued Nov. 13, 1984 to Smith, Jr. et al. is directed toward the use of an electromagnetic wire ring resonator wherein field distributions of the electromagnetic waves are spatially rotated about the direction of propagation of such waves in said resonator. This arrangement enables waves of opposite polarization senses to resonate with different frequencies.

U.S. Pat. No. 4,229,106 issued Oct. 21, 1980 to Dorschner et al. is directed toward the use of an electromagnetic wave resonator including means to spatially rotate the electromagnetic field distribution of waves resonant thereon about the direction of propagation of such waves to enable the waves to resonate with opposite senses of circular polarization.

U.S. Pat. No. 4,141,651 issued Feb. 27, 1979 to Smith et al. discloses a four frequency laser gyroscope system for producing outputs signals representing the frequency differences between counter-circulating wave pairs circulating as two beams within the gyroscope cavity. A partially transmitting dielectric mirror forms both one of the cavity reflectors and the means for extracting a small portion of the beam. Each resultant beam is then polarization discriminated to extract the desired signal content.

U.S. Pat. No. 4,108,553 issued Aug. 22, 1978 to Zampiello et al. discloses a four frequency laser gyroscope system having parallel processing of pathlength control and detection signals. Two output signal beams each containing component of the two of the four waves circulating in the laser cavity are shown upon separate detector diodes. The low frequency component is processed to control the optical pathlength, and the high frequency component is processed to produce a signal representing the amount of cavity rotation.

U.S. Pat. No. 4,320,974 issued Mar. 23, 1982 to Ljung discloses an electronic circuit using the outputs of gyro fringe detectors as both photo detectors and preamplifiers. Thus, the same detectors are used to serve two purposes. Pathlength control simplification and cost reduction is thus realized since it is unnecessary to mount and align separate photo detectors to a gyro.

A. D. White, "Frequency Stabilization of Gas Lasers", IEEE JOURNAL OF QUANTUM ELECTRONICS, Vol. QE-1, No. 8, November, 1965 surveys the state of the art in the field of frequency stabilization of gas lasers. A brief discussion of the methods employed to determined the freuqency stability of lasers is followed by a listing of the principle causes of frequency instability. The close relationship existing between the control system design in the laser environment is pointed out. Stabilization techniques based on the use of atomic resonance and on the use of interferometers are discussed in detail.

U.S. Pat. No. 4,383,763 issued May 17, 1983 to Hutchings et al. discloses a mirror which may be internal to a ring laser gyroscope constrained to translation and whose position is controlled by a piezoelectric ceramic actuator operating as a bimorph.

U.S. Pat. No. 4,585,346 issued Apr. 29, 1986 to Ljung discloses a path length controller for a three axis ring laser gyroscope assembly that includes a power detector for each of three beams and electronic circuitry and actuators for controlling the positions of three movable mirrors to maintain the power level in each beam at a maximum value.

DESCRIPTION OF THE PREFERRED EMBODIMENT

Figure 1:
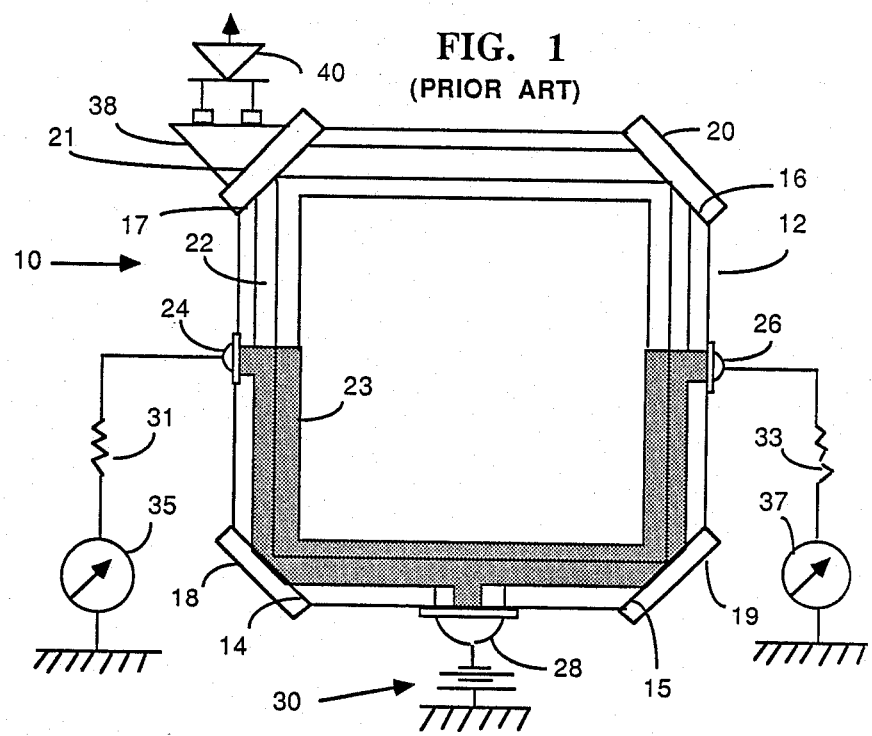
FIG. 1 is a perspective view of a ring laser gyroscope.

Referring to FIG. 1, a ring laser gyroscope 10 includes a frame 12 that has a generally rectangular shape with the corners cut off to form four mounting faces 14–17. A plurality of mirrors 18–21 are mounted on the mounting faces 14–17, respectively. A cavity 22 is formed in the frame 12 to form a path around the frame 12 between the mirrors 18–21.

A lasing medium 23 is positioned in the cavity 22 to produce counterpropagating light beams therein. The lasing medium 23 is typically a mixture of helium and neon confined to the cavity 22. Energy may be delivered to the lasing medium 23 by a pair of power supplies 35 and 37 which applies voltage between a pair of anodes 24 and 26 and to a cathode 28. Other structures may be used for the ring laser gyroscope 10. The basic description of the ring laser gyroscope 10 is presented by way of example and not for limitation of the present invention to a particular ring laser gyroscope structure.

One of the mirrors, for example the mirror 21 is partly transmissive so that a portion of each beam enters a prism 38 mounted to the back of the mirror 21. The prism 38 is formed to combine the counterpropagating beams so that they interfere with one another before impinging upon a photodetector 40.

The two counterpropagating beams undergo phase shifts in circulating around the cavity 22 as the cavity 22 rotates about its sensor axis. The difference in the phase of the two counterpropagating beams is indicative of the rotation rate of the cavity 22 about its sensor axis. Since the cavity 22 acts as a resonant cavity to the two beams, the frequency of each beam is sharply defined.

Figure 2:
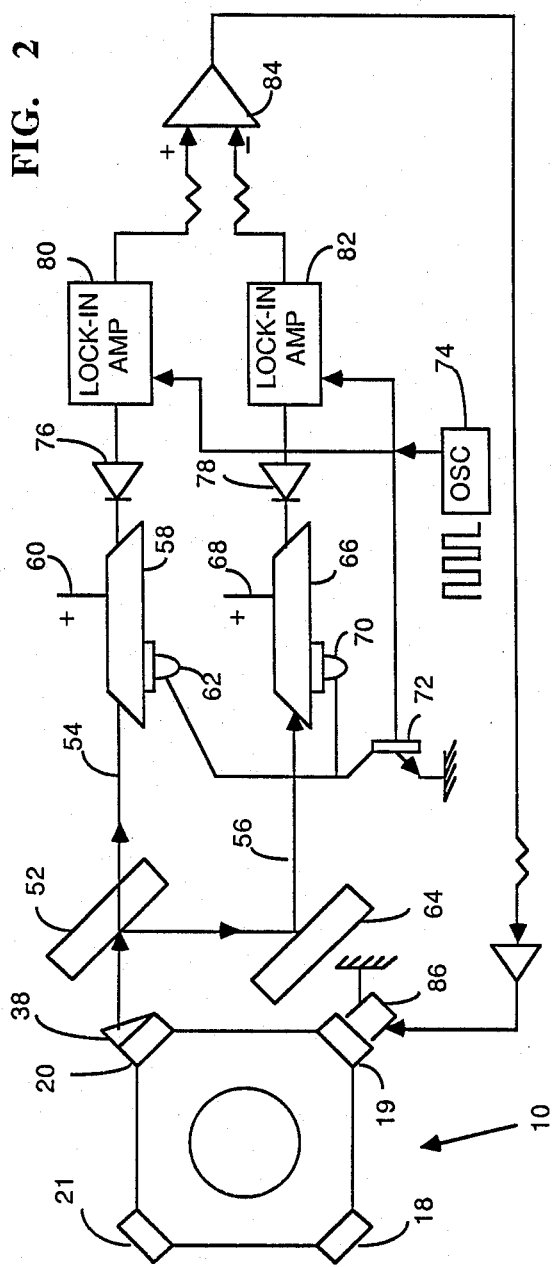
FIG. 2 schematically illustrates the apparatus of the present invention for controlling the cavity length in the ring laser of FIG. 1.

FIG. 2 illustrates apparatus according to this invention for providing actuating signals to a cavity length controller 50. The cavity length, which is the distance traversed by the beams in a complete trip around the cavity 22, may be controlled by monitoring the intensity of one or both of the beams in the ring laser gyroscope 10. Usually the desired cavity length is that which causes light of a desired frequency to have maximum intensity in the cavity.

Referring to FIGS. 1 and 2 the mirror 20 is only partly reflective, and it allows a portion of the laser light to be transmitted out of the ring laser cavity 22. Referring to FIG. 2, this beam output from the ring laser cavity is transmitted to a beam splitter 52 which splits the cavity output beam into a pair of source beams 54 and 56. The source beam 54 is transmitted through the beam splitter 52, and the source beam 56 is reflected away at a specified angle. The source beam 54 and the source beam 56 are then separately transmitted to a gain cell 58 and a gain cell 66, respectively. The beam splitter 52 may be eliminated. The source beams 54 and 56 are then the two clockwise and anticlockwise beams after they exit mirror 20.

The gain cell 58 may comprise a cylindrical hollow body 61 with slanted ends 63 and 65. The slanted ends 63 and 65 prevent unwanted reflection. Alternatively, the ends may not be slanted but instead have antireflective coatings (not shown) on them to prevent unwanted reflections. The ends 63 and 65 are transparent to the wavelengths of the laser light. A voltage is applied across an anode 60 and cathode 62 attached to the gain cell 58 to excite a gas, preferably $Ne^{20}$, enclosed in the body 61. The source beam 54 stimulates the excited atoms to emit light coherent with the source beam. The intensity of the source beam 54 is thus amplified as it passes longitudinally through the gain cell 58. The intensity of the source beam 56 is similarly amplified by the gain cell 66.

The second source beam 56 is deflected by a mirror 64 into a second gain cell 66 that preferably contains $Ne^{22}$ isotope. The gas inside this gain cell 66 is excited in the same manner as the gas is excited in the first gain cell 58. A voltage is applied across an anode 68 and a cathode 70 to excite the enclosed gas. The source beam 56 stimulates the excited atoms $Ne^{22}$ so that they produce light coherent with the source beam 56. This light produced in the gain cells 66 adds to the source beam 56 intensity and thus amplifies the light input to the gain cell 66.

$Ne^{20}$ and $Ne^{22}$ are used in the two gain cells, respectively. Their gain centers are separated by approxiamtely 880 MHz. Gain maximum for the dual isotope gas mixture is roughly midway between the gain centers for $Ne^{20}$ and $Ne^{22}$. The laser gyro is typically operated at or near this gain maximum. Midway between the two line centers, the gain slopes of the two isotopes have opposite signs. Therefore if one measures the amplification of a laser beam by two gain cells each containing a different isotope, one finds that the difference between the two amplified signals is directly proportional to detuning away from the midpoint. Furthermore, the sign of the difference is related to the frequency of the source beam with respect to the midway point. Cavity length control is performed by holding this difference between the two amplified signals to a constant value or to zero. This is the main principle of this invention for providing cavity length control.

The cathodes 62 and 70 are attached to a switching device which may include a transistor 72. The cathodes 62 and 70 are connected to the collector if the transistor 72 is a JFET or to the source if the transistor 72 is a MOSFET. The base or gate, depending on whether the transistor 72 is a JFET or MOSFET, respectively, is tied to the output of an oscillator 74. The oscillator produces a reference frequency which is for example 1 kHz. Other frequencies may be used. As the oscillator output oscillates between high and low, it takes the transistor 72 from cuttoff to saturation. The transistor therefore effectively acts as a switch that switches the cathodes 62 and 70 between ground and open. When the cathode 62 is effectively grounded, electric current is allowed to flow through the first gain cell 58 and the second gain cell 66. This electric current excites the $Ne^{20}$ and $Ne^{22}$. When the catrhode 62 is effectively open, no current flows across the first gain cell 58 or the second gain cell 66 and the enclosed gases are not excited.

Thus the oscillator 74 and transistor 72 chop the gain cell discharge current at about 1 kHz and cause the first and second source beams to become amplified at a frequency of about 1 KHz. The amplified first source beam 54 is transmitted to a photodiode 76 which creates an electrical signal directly proportional to the intensity of the amplified first source beam. The amplified second source beam 56, upon exiting the seocnd gain cell is transmitted to a photodiode 78, which creates an electrical signal directly proportional to the intensity of the amplified second source beam.

The electrical signals produced by the photodiodes 76 and 78 are connected to the inputs of a pair of lock-in amplifiers 80 and 82, respectively. The oscillator 74 output frequency of approximately 1 kHz is used for the reference frequency of the lock-in amplifiers 80 and 82. Basically the lock-in amplifiers 80 and 82 operate as phase locked loops and lock-in to any frequency sufficiently close to the reference frequency generated by the oscillator 74. The voltage level of this locked-in frequency is then amplified.

These two amplified voltage signals are then compared by a comparator 84 to determine the sign and magnitude of the difference between them. A dc voltage signal produced by the comparator 84 is proportional to the difference between the two amplified signals output from the lock-in amplifiers 80 and 82. The output of the comparator 84 is then input to an amplifier 85.

The output of the amplifier 85 is input to an actuator 86 that controls the position of the mirror 19, which is constrained to translation. This mirror 19 is movable to give the ring laser gyroscope 10 the capability to maximize the intensity of the light. The structure of the movable mirror 19 and the actuator 86 are described in U.S. Pat. No. 4,383,763 issued May 17, 1983 to Hutchings et al. The disclosure of that patent is hereby incorporated by reference into this disclosure.

Figure 4:
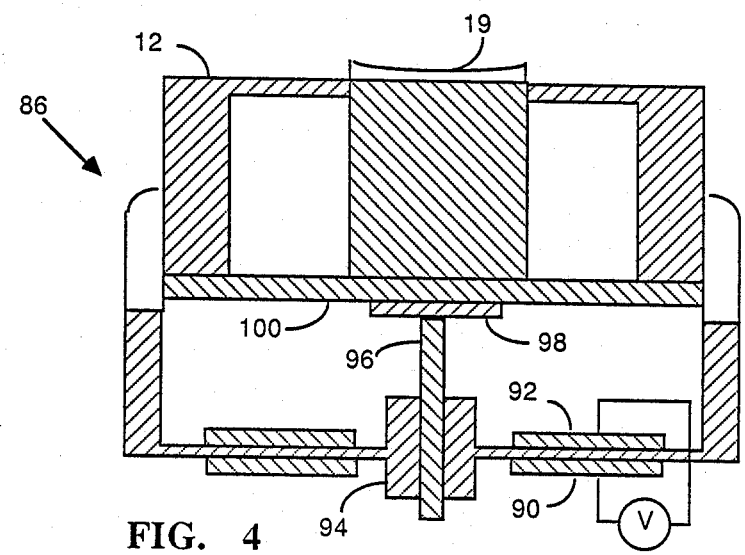
FIG. 4 is a cross sectional view of a cavity length control mirror and an actuator for moving the mirror.

Referring to FIG. 4, the mirror 19 is constrained to translation and its position is controlled by the piezoelectric actuator 86. The actuator 86 includes two annular piezoelectric ceramic wafers 88 and 90 which are attached to opposite faces of a membrane 92. Conductive films (not shown) may be deposited on the faces of the ceramic wafers 88 and 90 to form electrodes. The control voltage is connected to the axially-outward surface of the wafer 90 and to the axially-inward surface of the wafer 88.

In operation, the dc voltage proportional to the difference between the output of the two lock-in amplifiers 80 and 82 of FIG. 2 causes one of the wafers 88 or 90 to lengthen and the other wafer to shorten along the radial dimensions. The shortening of one wafer and the lengthening of the other warps the membrane 92 and forces the hub 94 either toward or away from the frame 12. The force on the hub 94 is transmitted through a bearing screw 96 and a bearing plate 98 to the center of a disc 100. The force is then transmitted axially to the mirror 19 to move it either inwardly toward the frame 12 or outwardly away from the frame 12. To avoid producing a force due to differential expansion of the wafer 88 and 90 the wafers preferably are matched to have substantially identical thermal expansion coefficients.

Figure 3:
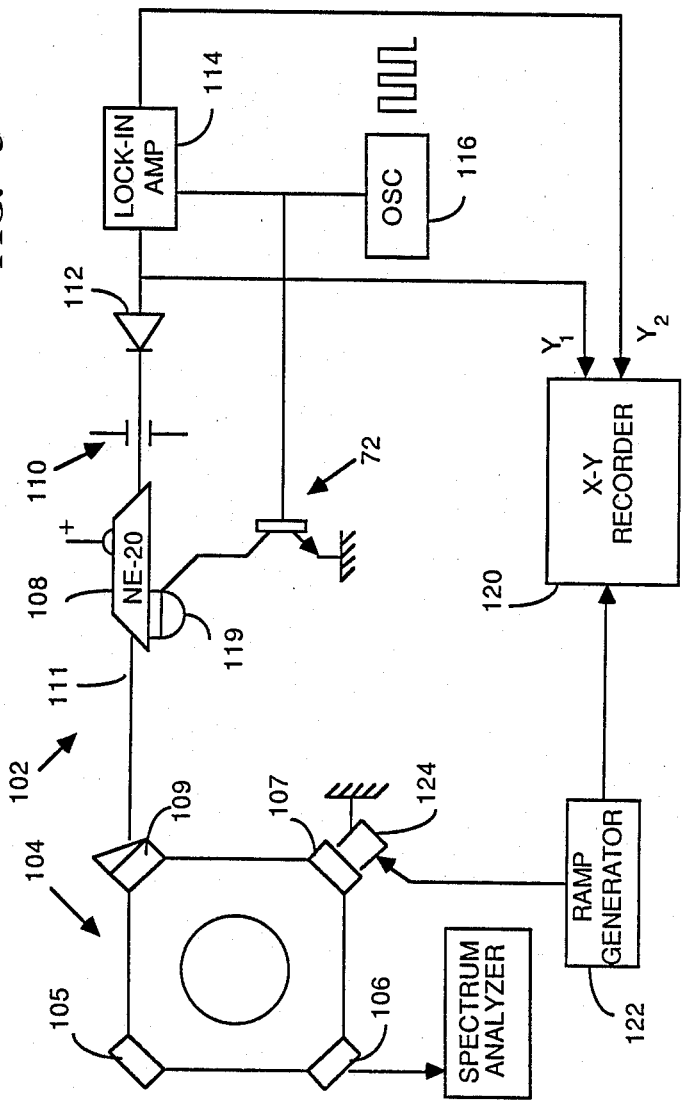
FIG. 3 schematically illustrates apparatus for evaluating the efficiency of gain cells included in the apparatus of FIG. 2.

FIG. 3 shows a system 102 for evaluating the accuracy and efficiency of the gain produced by a gain cell such as gain cells 58 and 66 of FIG. 2. This device requires a ring laser gyroscope 104. The basic setup is similar to that of FIG. 2. The mirrors 105-107, gyroscope 104, and the partially reflective mirror 109 are identical to corresponding components discussed above with reference to FIGS. 1 and 2.

However, in the system 102 the portion of the light beam transmitted out of the cavity by mirror 109 is not split but remains as one source beam 111 that is fed direclty into a gain cell 108 containing $Ne^{20}$. The gain cell 108 serves to amplify the source beam by causing it to pass through a chamber of excited $Ne^{20}$ which will amplify the intensity of the incident source beam as explained above.

Upon exiting from the gain cell 108, the amplified source beam is transmitted through an aperture 110 which allows only the on-axis portion of the source beam 111 to pass through. The unobstructed on-axis portion of the source beam 111 is transmitted to a photodiode 112, which converts the intensity of the amplified source beam 111 into an electrical signal. This electrical signal is fed into a lock-in amplifier 114 and amplified.

The reference frequency for the lock-in amplifier 114 and frequency at which the gain cell 108 amplifies the incident source beam is generated by an oscillator 116. The output from the oscillator 116 is connected to a transistor 118 which acts as a switch, causing the gas inside the gain cell to go from an unexcited state to an excited state and then back to an unexcited state at a frequency of 1 KHz by effectively causing a cathode 119, connected to the gain cell 108, to switch between open and ground at that frequency. The oscillator 116 output is connected to the reference voltage input of the lock-in amplifier 114, causing the lock-in amplifier to amplify signals with a frequency sufficiently close to the 1 kHz output frequency of the oscillator 116.

The functions of the lock-in amplifier 114, transistor 118, and the oscillator 116, are identical to the lock-in amplifier 80, the transistor 72, and the oscillator 74, respectively of FIG. 2.

Both the input and the output of the lock-in amplifier 114 are fed into an X-Y recorder 120 and plotted verses a ramp wave 121. The ramp wave 121 is generated by a ramp generator 122. The output of the X-Y recorder 120 permits diagnostics of the adequacy of the electrical signal produced from the photodiode 112 and the effect of the lock-in amplifier 114 on that signal. Also, since the movable mirror 107 and its piezoelectric actuator 124 are controlled by the same ramp wave 121 as used by the X-Y recorder 120 it is also possible to analyze the effect of mirror movement on the intensity of the source beam.

The movable mirror 107 and the piezoelectric actuator 124 are identical to items 19 of FIG. 1, and 86 of FIG. 4 and described above.

Figure 5:
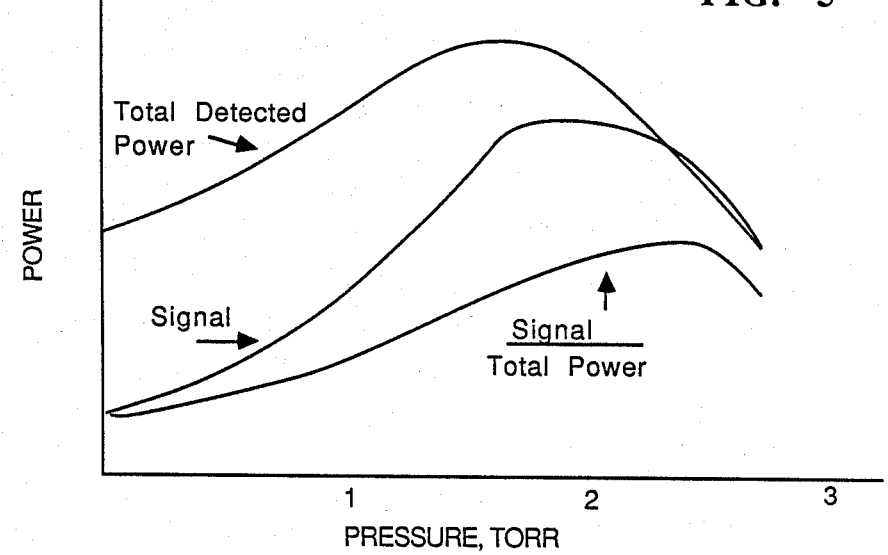
FIG. 5 graphically illustrates the dependence of the gain of a mixture of He—$Ne^{20}$ on the total gas pressure in a gain cell included in the invention.
Figure 6:
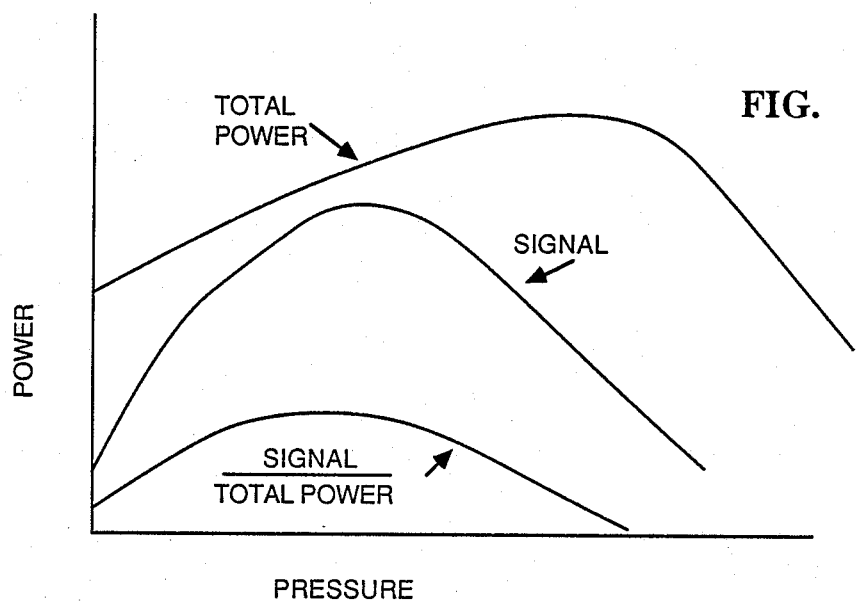
FIG. 6 graphically illustrates the dependence of the gain of a mixture of He—$Ne^{22}$ on the total gas pressure in a gain cell included in the invention.
Figure 7:
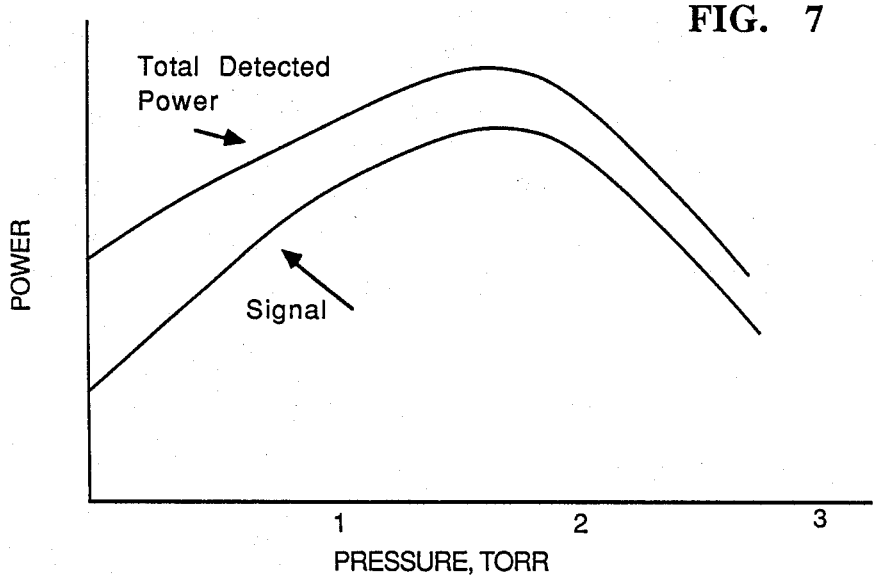
FIG. 7 graphically illustrates the dependence of the gain of a mixture of He—$Ne^{20}$—$Ne^{22}$ on the total gas pressure in a gain cell included in the invention.

FIG. 5 shows the dependence of the gain of the dual isotope $HeNe^{20}$ mix on the total gas pressure and on the average discharge current. The data of FIG. 5 was obtained for a He:Ne$^{20}$ ratio of 17:1. The partial pressure of the Ne$^{20}$ was 0.2 Torr, partial pressure of the Ne was 3.5 Torr. The power levels plotted in FIGS. 5-7 are in arbitrary units to show relative values of the total detected power, the signal and the ratio of the signal to the detected power. Referring to FIG. 5, the peak gain is shown to occur at about 2 torr, which is due to the large bore diameter of the gain cell.

FIG. 6 shows the dependence of the gain of the dual isotope He—Ne$^{22}$ mix on the total gas pressure and on the average discharge current. The data of FIG. 6 was taken for a He:Ne$^{20}$ ratio of 19:1. The partial pressure fo the Ne$^{22}$ was 0.2 Torr. Both FIGS. 5 and 6 were generated with the source tuned to maximize the lock-in signal. The rest of the data given in these two figures was taken with an average current of about 2 mA and total pressure of 2.5 to 3.5 torr. An average current of less than 2 mA (4 mA peak curent) often leads to discontinuity (shut-down) of the discharge.

The data of FIG. 7 was taken with He—Ne$^{20}$—Ne$^{22}$ in the ratio of 30:1:1 and a total pressure of 3.063 Torr. FIGS. 5-7 show the detuning characteristics of the detected signal, i.e., gas gain, for HeNe$^{20}$, HeNe$^{22}$ and HeNe$^{20}$Ne$^{22}$ gas mixtures. The shift between the two isotopes is evident. The signal maxima however appear to be closer together due to the roll off of the source intensity on both sides. This limits the operating range of the cavity length controller system to about 500 MHz about line center. This range could be doubled by additional circuitry, described with reference to FIG. 8, that divides the signal voltage by the source intensity.

Figure 8:
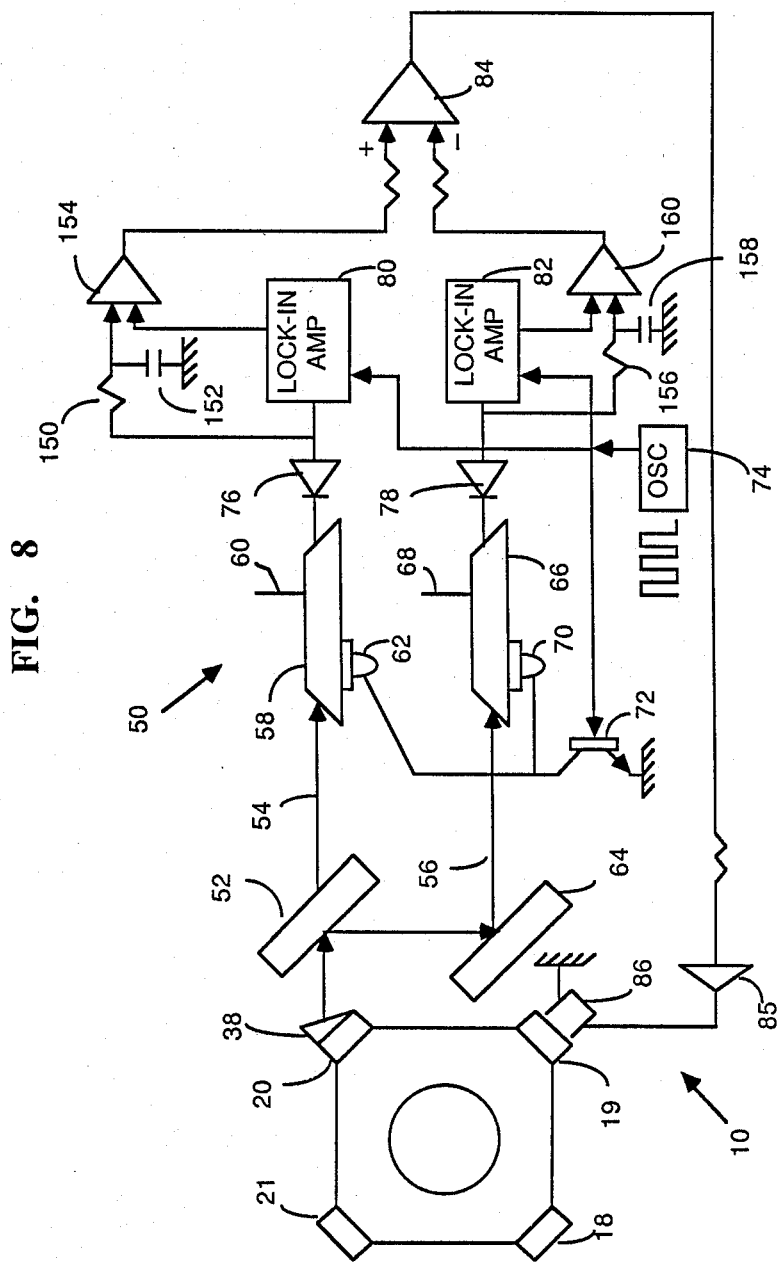
FIG. 8 illustrates the use of logarithmic amplifiers for processing the output of the gain cells of FIG. 2.

Referring to FIG. 8, the outputs of lock-in amplifiers 80 and 82 are fed to logarithmic amplifiers 154 and 160 respectively. The dc output from detectors 76 and 78 is also fed to logarithmic amplifiers 154 and 160, through resistors 150 and 156. The signals input to the logarithmic amplifiers 154 and 160 from the gain cells 58 and 66, respectively, are connected to ground through capacitors 152 and 158, respectively. The function of these logarithmic amplifiers 154 and 160 is to produce a voltage that is proportional to the logarithm of the ratio of the lock-in output and dc input level, thereby removing the effect of roll off of the source beams 54 and 56 with detuning from the detected gain of cells 58 and 66. Linear ratio amplifiers (not shown) may be used instead of logarithmic amplifiers if linear signals are more desirable than logarithmic ratio signals.

What is claimed is:

1. A cavity length control system for a ring laser that includes a frame having a cavity therein for guiding a pair of counter propagating light beams and a cavity length control mirror mounted to the frame, comprising:

means for extracting a portion of each of the counter propagating light beams from the cavity;

means for splitting the light beams extracted from the cavity into a first source beam and a second source beam;

first gain means for amplifying the first source beam, the first gain means including a first isotope of a gas having a first gain profile that includes a natural resonance frequency of the first isotope;

second gain means for amplifying the second source beam, the second gain means including a second isotope of the gas having a second gain profile that includes a natural resonance frequency of the second isotope; and means for applying to the cavity length control mirror a control signal indicative of the detuning of the frequency of the first and second source beams from a central frequency determined from superimposing the first and second gain profiles to move the cavity length control mirror to produce a cavity length that permits light of a selected frequency to resonate in the cavity and also to stabilize the cavity length.

2. The cavity length control system of claim 1 wherein the first gain means comprises:

means for passing the first source beam through a first chamber containing the first gas; and means for applying an energizing voltage to the first gas so that the first source beam stimulates the first gas to produce light that is coherent with the first source beam and produce an amplified first source beam.

3. The cavity length control system of claim 2 wherein the first gas comprises Ne$^{20}$.

4. The cavity length control system of claim 1 wherein the second gain means comprises:

means for passing the second source beam through a second chamber containing the second gas ; and means for applying an energizing voltage to the second gas so that the second source beam stimulates the second gas to produce light that is coherent with the second source beam and produce an amplified second source beam.

5. The cavity length control system of claim 4 wherein the second gas comprises Ne$^{22}$.

6. The cavity length control system of claim 4 wherein the first gain means comprises:

means for passing the first source beam through a first chamber containing the first gas; and means for applying an energizing voltage to the first gas so that the first source beam stimulates the first gas to produce light that is coherent with the first source beam and produce an amplified first source beam.

7. The cavity length control system of claim 6, wherein the means for applying the control signal to the cavity length control mirror comprises:

means for producing a first electrical signal indicative of the intensity of the amplified first source beam; and means for producing a second electrical signal indicative of the intensity of the amplified second source beam.

8. The cavity length control system of claim 7, further comprising:

a first lock-in amplifier for amplifying the first electrical signal; and a second lock-in amplifier for amplifying the second electrical signal.

9. The cavity length control system of claim 8, further comprising:

an oscillator for producing a reference signal having a specified reference frequency;

means for chopping the energizing voltages applied to the first and second gain means at the specified reference frequency; and means for applying the specified reference frequency to the first and second lock-in amplifiers.

10. The cavity length control system of claim 9, further including:

first normalizing means for producing a first normalized signal that is indicative of the ratio of the signal output from the first gain means and the source intensity;

second normalizing means for producing a second normalized signal that is indicative of the ratio of the signal output from the second gain means and the source intensity; and means for processing the first and second normalized signals output to control the position of the cavity length control mirror.

11. The cavity length control system of claim 9, further comprising:

a first cathode and second cathode mounted to the first and second gain means, respectively;

a switching device connected between the oscillator and the first and second cathodes;

means for applying the specified reference frequency to the switching device; and means for controlling the switching device to switch the first and second cathodes between open and ground at the specified reference frequency.

12. The cavity length control system of claim 9, further comprising:

means for producing a dc voltage proportional to the difference in signals output from the first and second lock-in amplifiers;

an actuator connected to the cavity length control mirror for controlling the position of the cavity length control mirror relative to the frame of the ring laser gyroscope; and means for connecting the dc voltage to the actuator.

13. A cavity length control method in a ring laser that includes a frame having a cavity therein for guiding a pair of counter propagating light beams and a cavity length control mirror mounted to the frame, comprising the steps of:

extracting a portion of one of the light beams from the cavity;

splitting the light beam extracted from the cavity into a first source beam and a second source beam;

amplifying the first source beam with first gain means including a first isotope of a gas having a first gain profile that includes a natural resonance frequency of the first isotope;

amplifying the second source beam with second gain means including a second isotope of the gas having a second gain profile that includes a natural resonance frequency of the second isotope; and applying to the cavity length control mirror a control signal indicative of the detuning of the frequency of the first and second source beams from a central frequency determined from superimposing the first and second gain profiles to move the cavity length control mirror to produce a cavity length that permits light of a selected frequency to resonate in the cavity 14. The cavity length control method of claim 13, further comprising the steps of:

passing the first source beam through a first chamber containing the first gas; and applying an energizing voltage to the first gas so that the first source beam stimulates the first gas to produce light that is coherent with the first source beam and produce an amplified first source beam.

15. The cavity length control method of claim 14, including the step of forming the first gas to comprise $Ne^{20}$.

16. The cavity length control method of claim 13, further comprising the steps of:

passing the second source beam through a second chamber containing the second gas; and applying an energizing voltage to the second gas so that the second source beam stimulates the second gas to produce light that is coherent with the second source beam and produce an amplified second source beam.

17. The cavity length control method of claim 16, including the step of forming the second gas to comprise $Ne^{22}$.

18. The cavity length control method of claim 17, further comprising the steps of:

passing the first source beam through a first chamber containing the first gas; and applying an energizing voltage to the first gas in the first chamber so that the first source beam stimulates the first gas to produce light that is coherent with the first source beam and produce an amplified first source beam.

19. The cavity length control method of claim 18 wherein the step of applying the control signal to the cavity length control mirror comprises the steps of:

producing a first electrical signal indicative of the intensity of the amplified first source beam; and producing a second electrical signal indicative of the intensity of the amplified second source beam.

20. The cavity length control method of claim 19, further comprising the steps of:

amplifying the first electrical signal with a first lock-in amplifier; and amplifying the second electrical signal with a second lock-in amplifier.

21. The cavity length control method of claim 20, further including the steps of:

producing a first normalized signal that is indicative of the ratio of the signal output from the first gain means and the source intensity;

producing a second normalized signal that is indicative of the ratio of the signal output from the second gain means and the source intensity; and processing the first and second normalized signals output to control the position of the cavity length control mirror.

22. The cavity length control method of claim 20, further comprising the steps of:

producing a reference signal having a specified reference frequency with an oscillator;

chopping the energizing voltages applied to the first and second gain means at the reference frequency; and applying reference frequency to the first and second lock-in amplifiers.

23. The cavity length control method of claim 20 wherein the step of chopping the energizing voltages applied to the first and second gain means at the reference frequency includes connecting:

a first and second cathode to the first and second gain cell means, respectively; and a transistor between the oscillator and the first and second cathodes.

24. The cavity length control method of claim 21, further comprising the steps of:

producing a dc voltage proportional to the difference in signals output from the first and second lock-in amplifiers;

connecting an actuator to the cavity length control mirror for controlling the position of the cavity length control mirror relative to the frame of the ring laser gyroscope; and connecting the dc voltage to the actuator.

25. A ring laser gyroscope, comprising:

a frame having a cavity therein for guiding a pair of counter propagating light beams reflective means for confining the counterpropagating light beams to a predetermined optical path in the cavity, the reflective means including at least one cavity length control mirror mounted to the frame;

cavity length control means for controlling the length of the optical path in the cavity, the cavity length control means including:

means for extracting a portion of at least one of the light beams from the cavity;

means for splitting the light extracted from the cavity into a first source beam and a second source beam;

first gain means for amplifying the first source beam, the first gain means including a first isotope of a gas having a first gain profile that includes a natural resonance frequency of the first isotope;

second gain means for amplifying the second source beam, the second gain means including a second isotope of the gas having a second gain profile that includes a natural resonance frequency of the second isotope; and means producing a control signal indicative of the detuning of the frequency of the first and second source beams from a central frequency determined from superimposing the first and second gain profiles; and actuator means responsive to the control signal for adjusting the position of the cavity length control mirror to produce a cavity length that permits light of a selected frequency to resonate in the cavity and to stabilize the cavity length.

26. The ring laser gyroscope of claim 25 wherein the first gain means comprises:

means for passing the first source beam through a first chamber containing the first gas; and means for applying an energizing voltage to the first gas so that the first source beam stimulates the first gas to produce light that is coherent with the first source beam and produce an amplified first source beam.

27. The ring laser gyroscope of claim 26 wherein the first gas comprises $Ne^{20}$.

28. The ring laser gyroscope of claim 25 wherein the second gain means comprises:

means for passing the second source beam through a second chamber containing the second gas ; and means for applying an energizing voltage to the second gas so that the second source beam stimulates the second gas to produce light that is coherent with the second source beam and produce an amplified second source beam.

29. The ring laser gyroscope of claim 28 wherein the second gas comprises $Ne^{22}$.

30. The ring laser gyroscope of claim 28 wherein the first gain means comprises:

means for passing the first source beam through a first chamber containing the first gas; and means for applying an energizing voltage to the first gas so that the first source beam stimulates the first gas to produce light that is coherent with the first source beam and produce an amplified first source beam.

31. The ring laser gyroscope of claim 30, wherein the means for applying the control signal to the cavity length control mirror comprises:

means for producing a first electrical signal indicative of the intensity of the amplified first source beam; and means for producing a second electrical signal indicative of the intensity of the amplified second source beam.

32. The ring laser gyroscope of claim 31, further comprising:

a first lock-in amplifier for amplifying the first electrical signal; and a second lock-in amplifier for amplifying the second electrical signal;

33. The ring laser gyroscope of claim 32, further comprising:

an oscillator for producing a reference signal having a specified reference frequency;

means for chopping the energizing voltages applied to the first and second gain means at the specified reference frequency; and means for applying the specified reference frequency to the first and second lock-in amplifiers.

34. The ring laser gyroscope of claim 33, further including:

first normalizing means for producing a first normalized signal that is indicative of the ratio of the signal output from the first gain means and the source intensity;

second normalizing means for producing a second normalized signal that is indicative of the ratio of the signal output from the second gain means and the source intensity; and means for processing the first and second normalized signals output to control the position of the cavity length control mirror.

35. The ring laser gyroscope of claim 34, further comprising:

a first cathode and second cathode mounted to the first and second gain means, respectively;

a switching device connected between the oscillator and the first and second cathodes;

means for applying the specified reference frequency to the switching device; and means for controlling the switching device to switch the first and second cathodes between open and ground at the specified reference frequency.

36. The ring laser gyroscope of claim 32, further comprising:

means for producing a dc voltage proportional to the difference in signals output from the first and second lock-in amplifiers;

an actuator connected to the cavity length control mirror for controlling the position of the cavity length control mirror relative to the frame of the ring laser gyroscope; and means for connecting the dc voltage to the actuator.

37. A method for measuring rotations, comprising the steps of:

forming a frame having a cavity therein for guiding a pair of counter propagating light beams;

confining the counterpropagating light beams to a predetermined optical path in the cavity;

mounting at least one movable cavity length control mirror to the frame;

controlling the length of the optical path in the cavity, the cavity length control means by the steps of:

extracting a portion of at least one of the light beams from the cavity;

splitting the light beam extracted from the cavity into a first source beam and a second source beam;

amplifying the first source beam with first gain means including a first isotope of a gas having a first gain profile that includes a natural resonance frequency of the first isotope;

amplifying the second source beam with second gain means including a second isotope of the gas having a second gain profile that includes a natural resonance frequency of the second isotope; and applying to the cavity length control mirror a control signal indicative of the detuning of the frequency of the first and second source beams from a central frequency determined from superimposing the first and second gain profiles to move the cavity length control mirror to produce a cavity length that permits light of a selected frequency to resonate in the cavity.

38. The method of claim 37, further comprising the steps of:

passing the first source beam through a first chamber containing the first gas; and applying an energizing voltage to the first gas so that the first source beam stimulates the first gas to produce light that is coherent with the first source beam and produce an amplified first source beam.

39. The method of claim 38, including the step of forming the first gas to comprise $Ne^{20}$.

40. The method of claim 37, further comprising the steps of:

passing the second source beam through a second chamber containing the second gas; and applying an energizing voltage to the second gas so that the second source beam stimulates the second gas to produce light that is coherent with the second source beam and produce an amplified second source beam.

41. The method of claim 40, including the step of forming the second gas to comprise $Ne^{22}$.

42. The cavity length control method of claim 41, further comprising the steps of:

passing the first source beam through a first chamber containing the first gas; and applying an energizing voltage to the first gas in the first chamber so that the first source beam stimulates the first gas to produce light that is coherent with the first source beam and produce an amplified first source beam.

43. The method of claim 42 wherein the step of applying the control signal to the cavity length control mirror comprises the steps of:

producing a first electrical signal indicative of the intensity of the amplified first source beam; and producing a second electrical signal indicative of the intensity of the amplified second source beam.

44. The method of claim 43, further comprising the steps of:

amplifying the first electrical signal with a first lock-in amplifier; and amplifying the second electrical signal with a second lock-in amplifier.

45. The method of claim 44, further including the steps of:

producing a first normalized signal that is indicative of the ratio of the signal output from the first gain means and the source intensity;

producing a second normalized signal that is indicative of the ratio of the signal output from the second gain means and the source intensity; and processing the first and second normalized signals output to control the position of the cavity length control mirror.

46. The method of claim 45, further comprising the steps of:

producing a reference signal having a specified reference frequency with an oscillator;

chopping the energizing voltages applied to the first and second gain means at the reference frequency; and applying reference frequency to the first and second lock-in amplifiers.

47. The method of claim 46 wherein the step of chopping the energizing voltages applied to the first and second gain means at the reference frequency includes connecting:

a first and second cathode to the first and second gain cell means, respectively; and a transistor between the oscillator and the first and second cathodes.

48. The cavity length control method of claim 47, further comprising the steps of:

producing a dc voltage proportional to the difference in signals output from the first and second lock-in amplifiers;

connecting an actuator to the cavity length control mirror for controlling the position of the cavity length control mirror relative to the frame of the ring laser gyroscope; and connecting the dc voltage to the actuator.

* * * * *